United States Patent
Nonomura

(10) Patent No.: US 6,400,850 B1
(45) Date of Patent: Jun. 4, 2002

(54) APPARATUS AND METHOD FOR SCIENTIFIC VISUALIZATION

(75) Inventor: Hitoshi Nonomura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/291,327

(22) Filed: Apr. 15, 1999

(30) Foreign Application Priority Data

Apr. 15, 1998 (JP) ............................................. 10-105175

(51) Int. Cl.⁷ .......................... G06K 9/36; G06T 15/40; G06F 15/80
(52) U.S. Cl. ......................... 382/285; 345/422; 345/505
(58) Field of Search ................................. 382/284, 285, 382/304; 345/4, 7, 581, 586, 422, 424, 428, 502, 505, 503, 504

(56) References Cited

U.S. PATENT DOCUMENTS

| | | | | |
|---|---|---|---|---|
| 5,111,410 A | * | 5/1992 | Nakayama et al. | 364/551.01 |
| 5,351,966 A | * | 10/1994 | Tohyama et al. | 273/311 |
| 5,731,810 A | * | 3/1998 | Oda | 345/192 |
| 6,115,047 A | * | 9/2000 | Deering | 345/422 |
| 6,169,551 B1 | * | 1/2001 | Koyamada | 345/424 |

FOREIGN PATENT DOCUMENTS

| JP | 61-210678 | 9/1986 |
|---|---|---|
| JP | 9-293146 | 11/1997 |
| JP | 9293146 | 11/1997 |

* cited by examiner

Primary Examiner—Leo Boudreau
Assistant Examiner—Kanji Patel
(74) Attorney, Agent, or Firm—Foley & Lardner

(57) ABSTRACT

The apparatus for visualizing an image, of the present invention, comprises: a visualization processing unit having a numerical simulator for computing and analyzing a condition of an object; and a pixel data generator for generating pixel data representing the condition of the object based on the simulated result by the numerical simulator and parameters for visualization and generating a Z-buffer value representing a depth from a specified viewpoint; and an image display for displaying an image based on synthetic pixel data, the display having a pixel data synthesizer for synthesizing the synthetic pixel data for one frame from the pixel data and the Z-buffer value supplied from the pixel data generator, said image display being connected to said visualization processing unit through an external network.

4 Claims, 4 Drawing Sheets

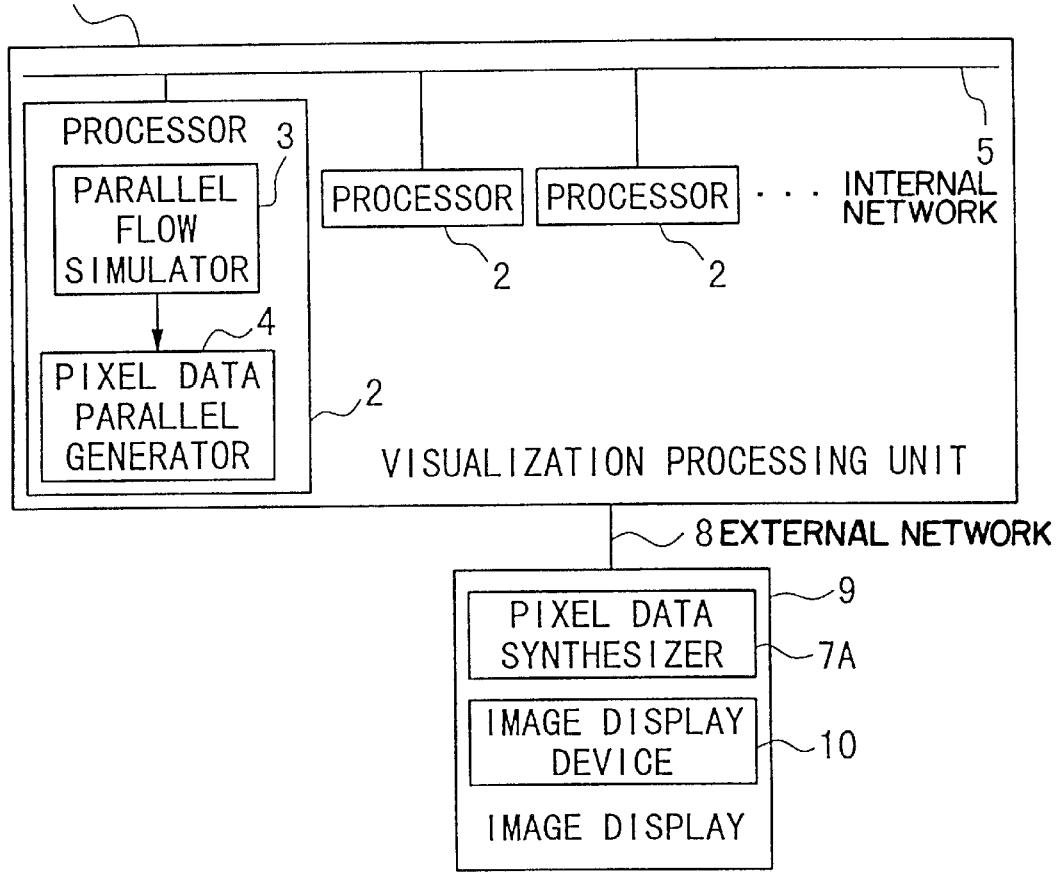
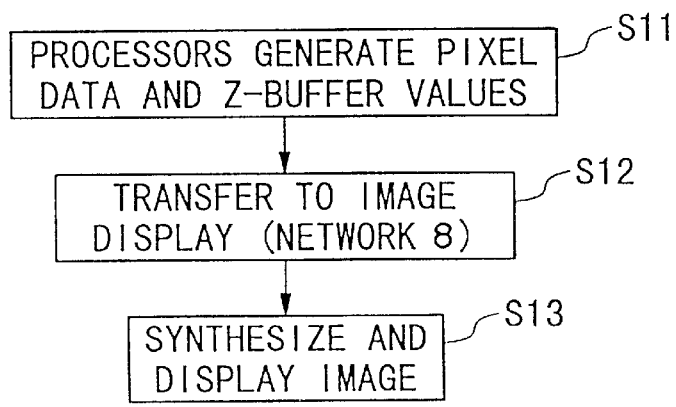

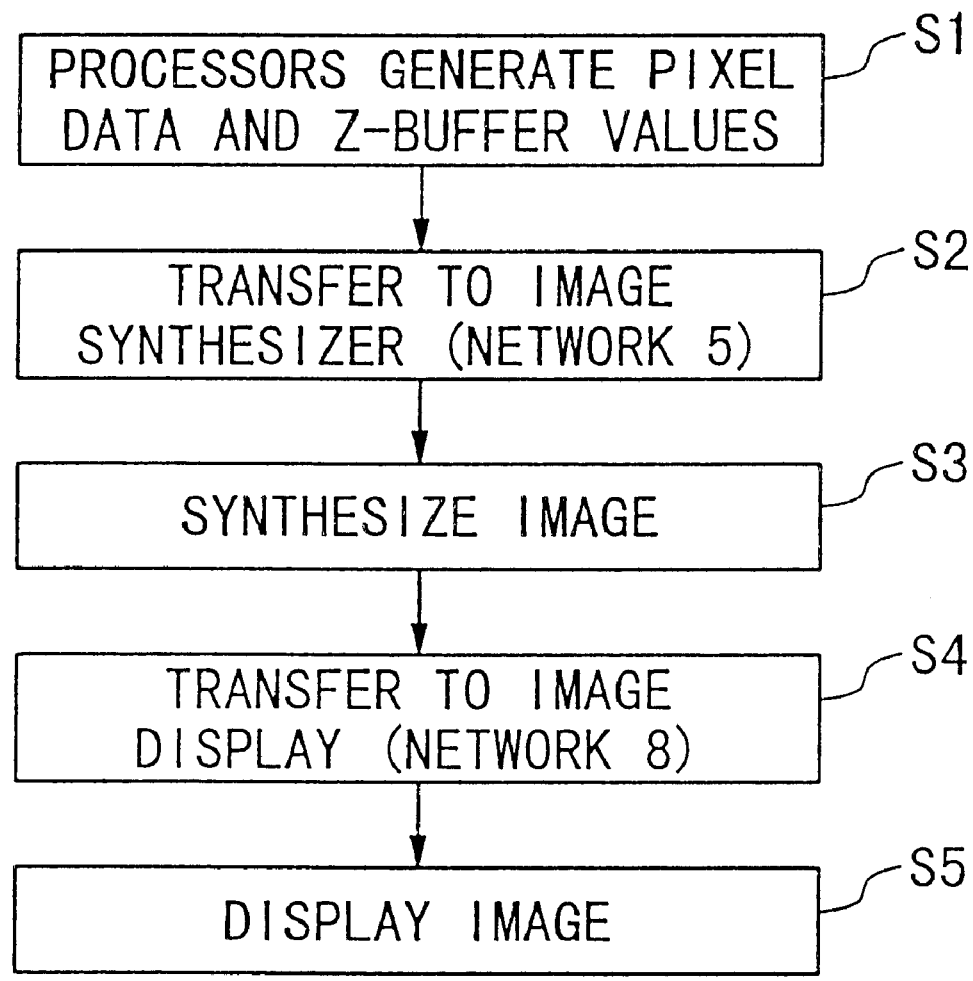

APPARATUS AND METHOD FOR SCIENTIFIC VISUALIZATION

BACKGROUND OF THE INVENTION

1. Field of the Invention

The present invention relates to an apparatus and a method for visualizing computational results in scientific and engineering field by performing numerical simulation while synthesizing image data based on the simulation.

This application is based on Japanese Patent Application No. 10-105175, the contents of which are incorporated herein by reference.

2. Description of the Related Art including information disclosed under 37 CFR 1.97 and 1.98

The conditions of flow of air or water, a magnetic field, and an electric field cannot be seen, but can be visualized using a simulation. To visualize the physical phenomenon, the processors perform a simulation and a visualization process in a parallel processing manner, which will be described below.

The processors perform the computation, and generate polygon data from graphic processing based on the simulation. The polygon data are transferred to an image display, which then performs synthesis of the polygon data and rendering computation for the polygon data based on visualization parameters. As the result, the image display hows images based on the polygon data representing the condition to the fluid flow.

In general, as the scale of the numerical simulation becomes large, the amount of the polygon data becomes enormous. The transfer of the polygon data takes much time while performing the computation and the visualization process simultaneously. As the result, the visualization process becomes slow.

A visualization technique, which visualizes the condition of the target object quickly based on the computational result, has been proposed in Japanese Patent Application, First Publication No. Hei 09-293146. As shown in FIG. 4, the visualization processing unit 1 of the background art includes multiple of processors 2 connected to an internal network 5. The processors 2 perform the computation using parallel flow simulators 3 and the generation of the pixel data using, pixel data parallel generators 4 in a parallel processing manner. The generated image pixel data is transferred through the internal network 5 to an image synthesizer 6, which then Synthesizes pixel data for one frame using a pixel data synthesizer 7 and transfers the data through the network 8 to an image display 9.

In this visualization processing unit 1, the parallel flow simulator 3 computes and analyze the condition of the target object. As shown in FIG. 5, based on the computation and the preset parameters for visualization, the pixel data parallel generators generate the pixel data, which represent the image of the condition of the target object, and Z-buffer values, which represent depths from a specified viewpoint (step S1). The pixel data and the Z-buffer values are transferred to the pixel data synthesizer 7 in the image synthesizer 6 connected to the internal network 5 (step S2). The pixel data synthesizer 7 synthesizes synthetic pixel data for one frame from the pixel data and the Z-buffer values (step S3), transfers the synthesized pixel data to the image display 9 connected to the external network 8 (step S4), and displays the image (step S5). That is, the data generated by the processors 2 are gathered once at the image synthesizer 6, and then are transferred to the image display 9.

This conventional visualization processing system is effective when the data transfer rate of the internal network 5 is higher than that of the external network 8. for example, when the visualization processing unit 1 is provided in a parallel computer with multiple processor elements (PEs) so that the PEs are assigned as the processors 2 and the image synthesizer 6. In the parallel computer, the data transfer between the processors 2 and the image synthesizer 6 actually is the communication between PEs which is faster than that of the normal network.

The amount of the data transferred between the processors 2 and the image synthesizer 6 is greater than that transferred between the image synthesizer 6 and the image display 9. Actually, the size of the pixel data transferred between the processors 2 and the image synthesizer 6 is smaller than that between the image synthesizer 6 and the image display 9 because the pixel data generated by each processor 2 is the divided portion assigned to the processor 2. The amount of data transfer between the processors 2 and the image synthesizer 6 is increased because the Z-buffer values are added and the data from all the processors 6 are simultaneously transferred. Preferably, the image synthesizer 6 may be provided in a high speed network, and the synthesized image data may be transferred through the low speed network. thereby enhancing the efficiency. Thus, the conventional visualization processing system is advantageous when it is applied to the parallel computer.

Recently, a workstation cluster (WS cluster), in which a number of workstations each of which has only one PE, are connected by a normal network and work as a parallel computer performing the parallel processing at low costs, has received much attention. When the conventional visualization processing system is applied to the WS cluster. the data transfer between the processors 2 and the image synthesizer 6 through the network 5 is equivalent to the data transfer through the normal network, whose transfer rate is equal to that between the visualization processing unit 1 and the image display 9 through the network 8. Therefore, the time required to transfer the data from the processors 2 to the image synthesizer 6 is actually equal to the time required to transfer the data to the image display 9. The unnecessary data transfer between the image synthesizer 6 and the image display 9 makes the process inefficient.

BRIEF SUMMARY OF THE INVENTION

It is therefore an object of the present invention to provide an apparatus and a method for visualizing image quickly based on the pixel data even when the internal network in the visualization processing unit is slow.

In order to accomplish the above object, the apparatus for visualizing an image. comprises: a simulator for computing and analyzing a condition of an object in a visualization processing unit; a pixel data generator for generating pixel data representing the condition of the object based on the simulation by said simulator and parameters for visualization and generating a Z-buffer value representing a depth from a specified viewpoint; a pixel data synthesizer for synthesizing synthetic pixel data for one frame from the pixel data and the Z-buffer value supplied from the pixel data generator, and an image display for displaying an image based on the synthetic pixel data, wherein the pixel data synthesizer is provided in the image display connected through an external network to the visualization processing unit.

In another aspect of the present invention, the pixel data synthesizers are provided both in the image display connected through the external network to the visualization processing unit, and in an image synthesizer connected through an internal network to the visualization processing unit. The pixel data and the Z-buffer values from the pixel data generator are selectively transferred to the image display or to the image synthesizer, depending on the data transfer rates in the internal network and the external network.

The visualization processing unit has multiple processors which include the flow simulators and the pixel data generators.

The method for visualizing an image, according to the present invention, comprises the steps of: simulating a condition of an object; generating pixel data representing the condition of the object based on the simulated result and parameters for visualization; tranferring a Z-buffer value representing a depth from a specified viewpoint; transferring the pixel data and the Z-buffer value through an external network to an image display; synthesizing synthetic pixel data for one frame from the pixel data and the Z-buffer value in the image display; and displaying an image based on the synthetic pixel data.

In another aspect of the invention, the method for visualizing an image, comprises the steps of: simulating a condition of an object; generating pixel data representing the condition of the object based on the simulated result and parameters for visualization; generating a Z-buffer value representing a depth from a specified viewpoint; transferring the pixel data and the Z-buffer value selectively to the image display connected through the external network to the visualization processing unit and to the image synthesizer connected to the internal network in the visualization processing unit; synthesizing synthetic pixel data for one frame from the pixel data and the Z-buffer value in the image display; and displaying an image based on the synthetic pixel data.

In another aspect of the present invention, the computer readable medium contains program instructions for visualizing an image, and the program instructions includes the steps comprising: simulating a condition of an object; generating pixel data representing the condition of the object based on the simulated result and parameters for visualization; generating a Z-buffer value representing a depth from a specified viewpoint; transferring the pixel data and the Z-buffer value through an external network to an image display; synthesizing synthetic pixel data for one frame from the pixel data and the Z-buffer value in the image display; and displaying an image based on the synthetic pixel data.

The program instructions further include the steps of transferring the pixel data and the Z-buffer value through an internal network to an image synthesizer; and synthesizing synthetic pixel data for one frame from the pixel data and the Z-buffer value in the image synthesizer.

BRIEF DESCRIPTION OF THE DRAWINGS

FIG. 1 is a block diagram showing the visualization processing system of the first embodiment of the present invention.

FIG. 2 is a flow chart showing the operation of the visualization processing system of the present invention.

FIG. 5 is a flow chart showing the operation of the conventional visualization processing system.

DETAILED DESCRIPTION OF THE INVENTION

Figure 3:
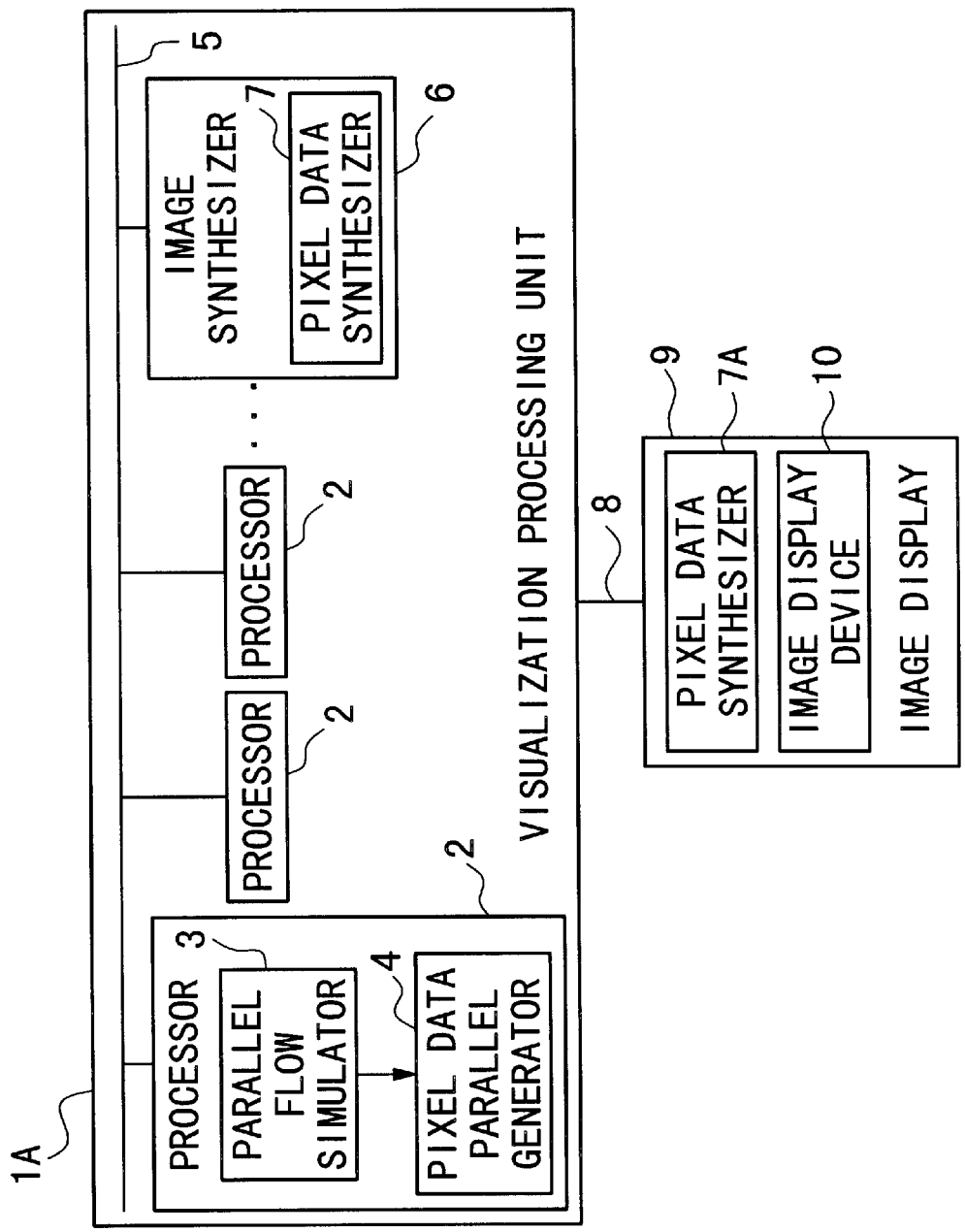
FIG. 3 is a block diagram showing the visualization processing system of the second embodiment of the present invention.
Figure 4:
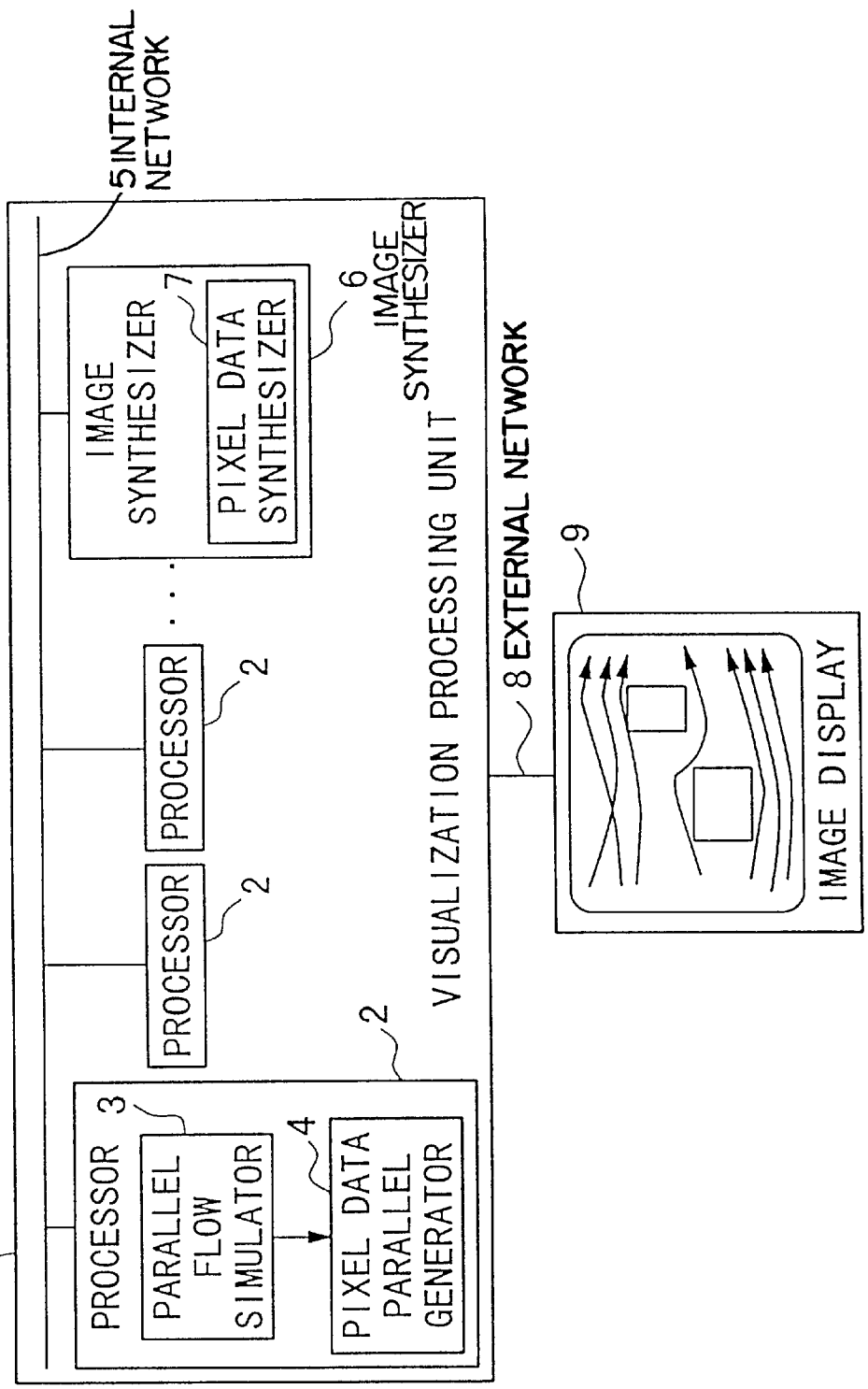
FIG. 4 is a block diagram showing the conventional visualization processing system.

The best mode of the present invention will be explained with reference to figures. FIG. 1 is a block diagram showing the visualization processing system of the present invention. Reference numeral 1A denotes the visualization processing unit, which includes multiple processors (computing elements) connected to an internal network 5. Each processor 2 comprises a parallel flow simulator 3, which is a numerical simulator, and a pixel data parallel generator 4, which is a pixel data generator. Each parallel flow simulator 3 simulates the temperature or the pressure of an object to be simulated, for example, air or water. Each of the pixel data parallel generators 4 generates pixel data of an image representing the condition of the analyzed object based on parameters for visualization, and generates Z-buffer values which represent the depths from a specified viewpoint.

Reference numeral 9 denotes an image display which is connected via an external network 8 to the visualization processing unit 1A, and which has a pixel data synthesizer 7A and an image display device 10. The pixel data synthesizer 7A converts the pixel data and the Z-buffer values, which are transferred through the external network 8 from the processor 2, into a set of synthetic pixel data to be displayed. The image display device 10 displays an image based on the synthetic pixel data.

While in the embodiment the simulator is the parallel flow simulator 3, the present invention is not limited to this, and the simulator may be a parallel electro-magnetic field solver or a parallel structural analysis. The simulators carry out the computation at a high speed because the target object is divided into multiple portions and the simulators independently perform calculations for the divided portions in a parallel processing manner.

The operation of the visualization processing unit will be explained with reference to the flow chart of FIG. 2. The pixel data parallel generators 4 in the visualization processing unit 1A generate the pixel data and the Z-buffer values representing the image of the condition of the object to be simulated, based on the simulated result according to the preset parameters for visualization (step S11). The pixel data and the Z-buffer values are transferred via the external network 8, not via the internal network 5, directly to the pixel data synthesizer 7A in the image display 9 (step S12). The pixel data synthesizer 7A synthesizes the synthetic pixel data for one frame from the pixel data and the Z-buffer values, and directs the image display device 10 to display the image (step S13).

For example, when this invention is applied to a workstation cluster whose normal network communication speed is equal to that of the visualization processing unit 1A, the image display 9 synthesizes the image, and the pixel data of the synthesized image is transferred not via the internal network 5, thereby making the simulation for air or water and the parallel visualization process efficient.

FIG. 3 is a block diagram showing the second embodiment of the present invention. In the second embodiment, the image display 9 has a pixel data synthesizer 7A, and an image synthesizer 6 is connected to an internal network 5 in a visualization processing unit 1A. The image synthesizer 6 has a pixel data synthesizer 7. In the visualization processing unit 1A, based on the computational result in a parallel processing manner by parallel flow simulators 3 in a plurality of processors 2, the pixel data parallel generators 4 in the processors 2 produce Z-buffer values representing the depths from a specified viewpoint. The produced pixel data and the Z-buffer values are transferred to the pixel data synthesizer 7, which converts them into a set of pixel data that is then sent to the image display 9. Alternatively, the pixel data and the Z-buffer values produced by the processors 2 can be transferred directly to the image display 9 in a manner similar to the first embodiment.

Thus, the parallel computer (visualization processing unit), which performs the parallel processing, includes multiple processor elements (PEs) which are connected to each other through the high speed network. The pixel data and the Z-buffer values are transferred from the processors 2 through the high speed network to the image synthesizer 6, in which the pixel data synthesizer 7 synthesizes the pixel data for one frame that is then sent to the image display device 10 in the image display 9. In contrast, in the recent network technology relating to the Internet and the parallel processing, workstations in a WS cluster, each of which includes a single PE. arc connected through a normal network and work as a parallel computer. The processors 2 in the WS cluster transfer the pixel data and the Z-buffer values directly to the pixel data synthesizer 7A in the image display 9 through the normal speed external network 8. eliminating unnecessary data transfer between the image synthesizer 6 and the image display 9 and a loss time. That is, the present invention performs the visualization process at a speed suitable to an environment in which the invention is used.

When only a few PEs are available in the parallel computer, for example, when the parallel computer inherently has only a few PEs, or when the number of the available PEs is limited depending on the environment, the background art assigns one PE as the image synthesizer. As the result, the number of the PEs which can execute the simulation and the generation of the pixel data is decreased by one, degrading the effect of the high speed parallel processing. In particular, with a small number of the PEs, the time required for the computation and the pixel data generation is lengthened when the number of the available PEs is decreased. Assuming that the process is completely performed in a parallel manner and that the processing time is ideally inversely proportional to the number of the PEs, when the number of the available PEs is decreased from one hundred by one, the processing time is lengthened by $1/100$. In contrast, when the number of the available PEs is decreased from four by one, the processing time is lengthened by $1/4$.

According to the invention shown in FIG. 1, all the PEs can be assigned for the simulation and the generation of the pixel data because the image synthesizer is eliminated. When the numerical simulation and the generation of the pixel data take much time, the increase in processing time due to the decease in the number of the PEs may be greater than the decrease in processing time by enhancing the network speed. In this situation. the structure shown in FIG. 1 may be preferably selected.

According to the present invention, the image display includes the pixel synthesizer, and the data is directly transferred from the pixel data generator to the image display when the data transfer speed of the network in the visualization processing unit is not high, thereby enhancing the efficiency in the data transfer. When the data transfer speed of the internal network is higher than that of the external network, the calculated data is gathered in the image synthesizer through the internal network, and is transferred through the slow external network to the image display. Thus, the large amount of the data can be processed in the internal network so that the data is visualized in a real-time manner while performing the analysis computation, and this invention can be applied to the workstation cluster.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. Am apparatus for visualizing an image, comprising:
   a visualization processing unit having a numerical simulator for computing a condition of an object, and a pixel data generator for generating pixel data representing the condition of an object based on the simulated result by said numerical simulator and parameters for visualization and generating a Z-buffer value representing a depth from a specified viewpoint; and
   an image display for displaying an image based on synthetic pixel, said display having a first pixel data synthesizer for synthesizing the synthetic pixel data for one frame from the pixel data and the Z-buffer value supplied from said pixel data generator, said image display being connected to said visualization processing unit through an external network,
   wherein said visualization processing unit has an image synthesizer including a second pixel data synthesizer for synthesizing the synthetic pixel data for one flame from the pixel data and the Z-buffer value supplied from said pixel data generator, said image synthesizer is connected through an internal network in said visualization processing unit, and the pixel data and the Z-buffer value are selectively transferred to said first pixel data synthesizer in said image display and said second pixel data synthesizer in said visualization processing unit.

2. An apparatus according to claim 1, wherein said visualization processing unit has a multiple processors which work as said numerical simulator and said pixel data generator.

3. A method for visualizing an image, comprising the steps of:
   simulating a condition of an object:
   generating pixel data representing the condition of the object based on the simulated result and parameters for visualization;
   generating a Z-buffer value representing a depth from a specified viewpoint;
   transferring the pixel data and the Z-buffer value selectively through an external network to an image display having a first pixel data synthesizer and through an internal network to an image synthesizer having a second pixel data synthesizer;
   synthesizing, with the first pixel data synthesizer or the second pixel data synthesizer, synthetic pixel data for one frame from the pixel data and the Z-buffer value in said image display or in said image synthesizer; and
   displaying an image based on the synthetic pixel data.

4. A computer readable medium containing program instructions for visualizing an image, the program instructions including instructions for performing the steps comprising:
   simulating a condition of an object;
   generating pixel data representing the condition of the object based on the simulated result and parameters for visualization;

generating a Z-buffer value representing a depth from a specified viewpoint;

transferring the pixel data and the Z-buffer value selectively through an external network to an image display having a first pixel data synthesizer and through an internal network to an image synthesizer having a second pixel data synthesizer;

synthesizing, with the first pixel data synthesizer or the second pixel data synthesizer, synthetic pixel data for one frame from the pixel data and the Z-buffer value in said image display or in said image synthesizer; and displaying an image based on the synthetic pixel data.

* * * * *